(12) United States Patent
Elms et al.

(10) Patent No.: US 7,730,493 B2
(45) Date of Patent: Jun. 1, 2010

(54) OBJECT SPACE WITH ACTIVE OBJECTS

(75) Inventors: Kim Elms, Carindale (AU); Stephen Milliner, Holland Park (AU); Julien J. P. Vayssiere, Red Hill (AU)

(73) Assignees: SAP AG, Walldorf (DE); Queensland University of Technology, Brisbane (AU)

( * ) Notice: Subject to any disclaimer, the term of this patent is extended or adjusted under 35 U.S.C. 154(b) by 1357 days.

(21) Appl. No.: 11/024,919

(22) Filed: Dec. 29, 2004

(65) Prior Publication Data

US 2006/0143620 A1 Jun. 29, 2006

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................... 719/316; 719/317
(58) Field of Classification Search .............. 719/316, 719/317
See application file for complete search history.

(56) References Cited

U.S. PATENT DOCUMENTS

| | | | | |
|---|---|---|---|---|
| 6,496,871 | B1 * | 12/2002 | Jagannathan et al. | 719/317 |
| 7,316,016 | B2 * | 1/2008 | DiFalco | 718/102 |
| 7,340,747 | B1 * | 3/2008 | Zeliger et al. | 719/328 |
| 7,398,313 | B1 * | 7/2008 | Inagaki et al. | 709/226 |
| 2005/0038766 | A1 * | 2/2005 | Bantz et al. | 707/1 |

OTHER PUBLICATIONS

Cordozo et al, "Using the Active Ojbect Model to Implement Multi-Agent Systems", 1993, IEEE, Proceeding of the 5th IEEE Int. Conf. on Tools with Artificial Intelligence, pp. 70-77.*
Murata et al., "Unification of active and passive objects in an object-oriented operating system," Aug. 1995, IEEE, Object-Orientation in Operating Systems, Fourth International Workshop, pp. 68-71.*
Holvoet et al., "Composing distributed applications through generative communication," 1998, ACM, In Proceedings of the 8th ACM SIGOPS European Workshop on Support For Composing Distributed Applications, EW 8, pp. 214-221.*
"Alta Vista Advanced Search: JBUserGuide", 4 pages, (2006).
"Alta Vista Advanced Search: JBUserGuide", 1 page, (2003).
Bettini, L., "Design and Implementation of a Programming Language for Mobile Code," [retrieved] Jun. 26, 2006, <http://music.dsi.unifi.it/abstracts/xklaim-thesis-abs.html>.
Bettini, L., et al., "An Infrastructure Language for Open Nets," *Dipartimento di Sistemi e Informatica*, Università di Firenze, (2002).

(Continued)

*Primary Examiner*—Hyung S Sough
*Assistant Examiner*—KimbleAnn Verdi

(57) ABSTRACT

A technique for facilitating coordination of actions by multiple programs involves providing an execution environment for active objects. The execution environment may be an object space. Client programs may write active objects to the object space, which execute on behalf of the client programs. The client programs may obtain the results of the executed active objects, even if the client program is disconnected from the object space while the active object is executing.

15 Claims, 11 Drawing Sheets

OTHER PUBLICATIONS

Bettini, L., et al., "Formalizing Properties of Mobile Agent Systems," *Dipartimento di Sistemi e Informatica*, Università di Firenze, pp. 72-87, (2002).

Bettini, L., et al., "Interactive Mobile Agents in X-KLAIM," *Dipartmento di Sistemi e Informatica*, Università di Firenze, (1998).

Bettini, L., et al., "Mobile Application in X-KLAIM," *Dipartimento di Sistemi e Informatica*, Università di Firenze, (2000).

Bettini, L., et al., "Klava: A Java Package Distributed and Mobile Applications", *Software Practice and Experience*, 00:1-31 (2000).

Bettini, L., et al., "Modelling Node Connectivity in Dynamically Evolving Networks", *Notes in Theoretical Computer Science* 54, (2001), <http://www.elsevier.nl/locate/entcs/volume54.html>.

Bettini, L., et al., "Software Update via Mobile Agent Based Programming," *Dipartimento di Sistemi e Informatica*, Università di Firenze, (2002).

Bettini, L., et al., "Structured Nets in KLAIM," *Dipartimento di Sistemi e Informatica*, Università di Firenze, (2000).

Bettini, L., et al., "Towards Object-Oriented KLAIM," Elsevier Science, (2002), <http://www.elsevier.nl/locate/entcs/volume62.html>.

Bettini, L. and Nicola, R.D., "A Java Middleware for Guaranteeing Privacy of Distributed Tuple Spaces," Dipartimento di Sistemi e Informatica, Università di Firenze, (2003).

Bettini, L. and De Nicola, R., "Mobile Distributed Programming in X-KLAIM," *Dipartimento di Sistemi e Informatica*, Università di Firenze, pp. 29-68, (2005).

Bettini, L. and De Nicola, R., "Translating Strong Mobility into Weak Mobility," *Dipartimento di Sistemi e Informatica*, Università di Firenze, pp. 182-197, (2001).

Bettini, L. et al., "X-Klaim and Klava Programming Mobile Code", *Dipartimento di Sistemi e Informatica*, Università di Firenze, pp. 1-14, (2001).

Bettini, L. and De Nicola, R., "Coordinating Mobile Object-Oriented Code", *Dipartimento di Sistemi e Informatica*, Università di Firenze, pp. 1-16, (2001).

Bettini, L. et al., "O'Klaim:A Coordination Language with Mobile Mixins", *Dipartimento di Sistemi e Informatica*, Università di Firenze (2001).

Bettini, L. et al., "Linguistic Constructs for Object-Oriented Mobile Code Programming & Their Implementations", *Dottorato Di Ricerca in Logica Mathematica e Informatica Teorica*, Università di Firenze (2001).

Bettini, L. et al., "Klava: A Java Package for Distributed and Mobile Applications. User's Manual", *Dipartimento di Sistemi e Informatica*, Università di Firenze (2004).

Ciancarini, P. and Rossi, D., "Jada: Coordination and Communication for Java Agents," XP-009014714, pp. 213-226, (1997).

De Nicola, R., et al., "Coordinating Mobile Agents via Blackboards and Access Rights," *Dipartimento di Sistemi e Informatica*, Università di Firenze, (1998).

De Nicola, R., et al., "KLAIM: a Kernel Language for Agents Interaction and Mobility," *Dipartimento di Sistemi e Informatica*, Università di Firenze, (1998).

De Nicola, R., et al., "KLAIM and its Access Control Mechanisms." (2000).

De Nicola, R., et al., "Locality Based Linda: Programming with Explicit Localities," *Dipartimento di Sistemi e Informatica*, Università di Firenze, (1997).

De Nicola, R., et al., "Programming Access Control: The KLAIM Experience," *Dipartimento di Sistemi e Informatica*, Università di Firenze, pp. 48-65, (2000).

De Nicola, R., et al., *Theoretical Computer Science*, 240:215-254, (2000).

De Nicola, R. and Loreti, M., "A Modal Logic for KLAIM," *Dipartimento di Sistemi e Informatica*, Università di Firenze, pp. 339-354, (2000).

De Nicola, R. and Loreti, M., "Types as Specifications of Access Policies" *Dipartimento di Sistemi e Informatica*, Università di Firenze, InSecure Internet Programming: Security Issues for Distributed and Mobile Objects 1603:117-146 (1999).

Fjellheim, T., et al., "The 3DMA Middleware for Mobile Applications," XP-002372247, pp. 312-323, (2004).

Gelernter, D., *ACM Transaction on Programming Languages and Systems* 7(1):80-112, (1985).

Handorean, R., et al., "Coordination Middleware Supporting Rapid Deployment of Ad Hoc Mobile Systems," Washington University in St. Louis, (2003).

Handorean, R., and Gruia-Catalin, R., "Service Provision in Ad Hoc Networks," *Department of Computer Science*, Washington University, (2003).

*LIME: Linda in a Mobile Environment*, [retrieved] Dec. 28, 2004, <http://lime.sourceforge.net/info/intro.html>.

Murphy, Amy L., "Enabling the Rapid Development of Dependable Applications in the Mobile Environment", Dissertation Presented to the Server Institute, Washington University, (2000).

Murphy, A.L., et al., "Lime: A Coordination Middleware Supporting Mobility of Hosts and Agents," Washington University in St. Louis (2003).

Murphy, A.L., et al., "Lime: A Middleware for Physical and Logical Mobility", Washington University in St. Louis, (2001).

Murphy, A.L., et al., "Using Coordination Middleware for Location-Aware Computing: A Lime Case Study", *Department of Computer Science*, University of Rochester and Dipartmento di Electronica e Informazione, Politecnico di Milano Italy (2003).

Pico et al., "Developing Mobile Computer Applications with Lime", *Dipartmento di Electronica e Informazione*, Politecnico di Milano Italy, (2000).

Pico et al., "Exploiting Transiently Shared Tuple Spaces for Location Transparent Code Mobility," *Dipartmento di Electronica e Informazione*, Politecnico di Milano Italy, (2002).

Pico et al., "Lime: Linda Meets Mobility", *Dipartmento di Electronica e Informazione*, Politecnico di Milano Italy, (1999).

Pico, Gian Pietro, "Understanding, Evaluating, Formalizing, and Exploiting Code Mobility", *Dipartmento di Automatica e Informatica, Doctoral Thesis* (1998).

Polze, A., TOOLS "Interactions in Distributed Programs Based on Decoupled Communications," XP-112372248, pp. 81-91, (1994).

Pugliese, R., "Access Control Mechanisms in KLAIM," *Dipartimento di Sistemi e Informatica*, Università di Firenze, (2002).

Rowstron, A., "Using Agent Wills to Provide Fault-tolerance in Distributed Shared Memory Systems," Microsoft Research Ltd., (2000).

Speer, A.S., et al., "JavaBoard User's Guide," XP-002372246, whole document, (Oct. 2003).

\* cited by examiner

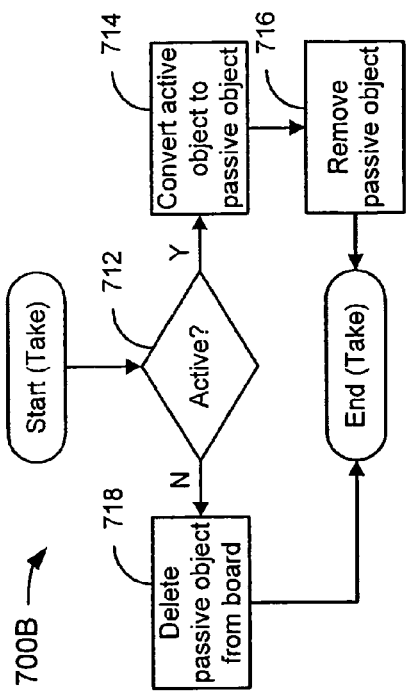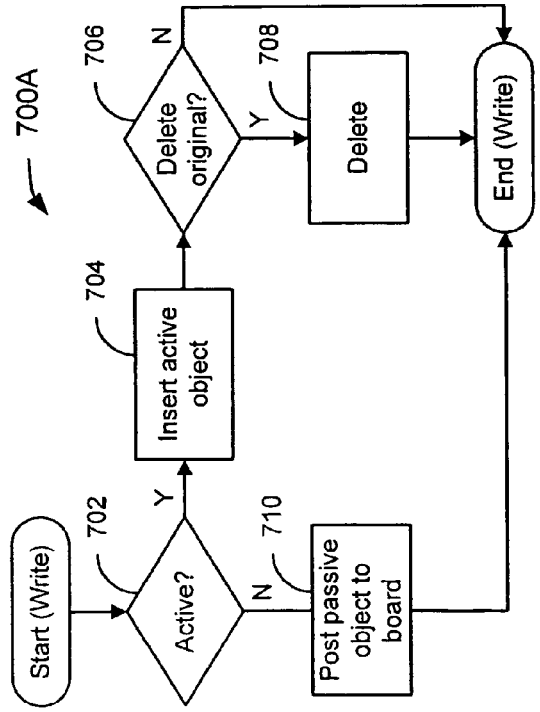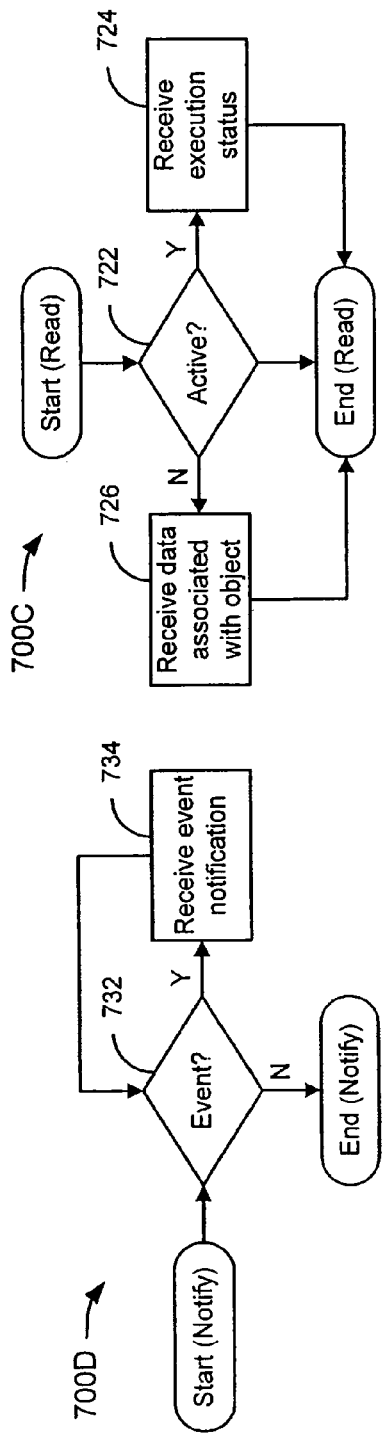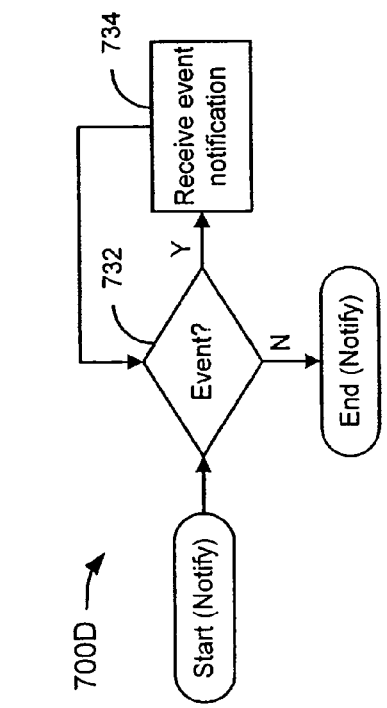
FIG. 7B
FIG. 7C
FIG. 7A
FIG. 7D

OBJECT SPACE WITH ACTIVE OBJECTS

BACKGROUND

This application relates generally to object-oriented computer programs and systems. In particular, the aspects of the invention are related to object spaces.

An object space may be implemented as an instance of a server to which participant programs connect as clients. Object spaces are the object-oriented incarnation of tuple spaces, which are well-known in the art of computer science. For example, in "Generative Communications in Linda", which is incorporated herein by reference, David Glernter describes tuple spaces. KLAIM (Kernel Language for Agents Interaction and Mobility), an extension of Linda for supporting mobile processes, is incorporated herein by reference. Lime (Linda In a Mobile Environment) is another extension of Linda, for distributed and mobile environments, that is incorporated herein by reference. In "Using Agent Wills to Provide Fault-tolerance in Distributed Shared Memory Systems", which is incorporated herein by reference, Antony Rowstron explains how to provide an "agent will" for an object. If a client program terminates abnormally, the agent will helps "clean up" the tuple space to remove any information that is not consistent with the fact that the client program is no longer reachable. With each of these prior art techniques, objects are not part of the tuple space. For example, agent wills cannot be affected by operations on the object space issued by other client programs.

Object spaces provide a way for multiple networked entities to coordinate their actions by writing objects to a shared space and querying this space for objects. FIG. 1A depicts a prior art system 10 that includes computers 12, 14, 16, and 18, coupled to one another across a WAN 20. The computers 12, 14, 16, and 18 respectively include client programs 22, 24, 26, and 28. The computer 14, for example, may include a server 30 with an object space 40. The client programs 22, 24, 26, 28 may perform operations on the object space 40 (across the WAN 20, in the case of the client programs 22, 26, and 28).

FIG. 1B depicts an alternative conceptual view of the system 10, in which the object space 40 is shown in more detail. The client programs 22, 24, 26, and 28 can write objects to the object space 40. For example, in FIG. 1B, the client programs are depicted as respectively writing objects 42, 44, 46, and 48. It may be possible for a client program (e.g., client program 24) to read an object (e.g., object 46) that has been written by another client program (e.g., client program 26). A client program (e.g., client program 28) may be able to issue a notify operation to a board 50 and receive event notifications, such as notifications of when an object has been operated upon (e.g., read or write). In addition, a client program may be able to delete (sometimes called "take") an object (not shown).

Object spaces have been found to be inefficient because operations performed on the object space have to go through a network (or between operating system processes). Another problem with object spaces is that they result in unnecessary coupling because participants need to stay connected to the object space (or risk losing information). This problem is particularly troublesome in mobile computing where devices with transient connectivity to the network. Another problem with object spaces is that they are inflexible because it is not possible to add functionalities beyond the set of base primitives. Another problem with object spaces is that they introduce a rigid separation between the object space itself and the client programs connected to the object space, which results in problems of efficiency and scalability, and puts constraints on clients.

The cost of using an object space becomes prohibitive for distributed tasks that contain a large number of object space operations, or for situations with a large amount of objects on the object space or a large number of clients connected to the object space (at least partly because notify operations do not scale).

SUMMARY

A technique for facilitating coordination of actions by multiple programs involves providing an execution environment for active objects. The execution environment may be an object space. Client programs may write active objects to the object space, which execute independent of the client programs. The client programs may obtain the results of the executed active objects, even if the client program is disconnected from the object space while the active object is executing.

A method according to the technique includes providing an object class in an object space, instantiating an active object in the object space from the object class, and executing the active object in the object space. In an embodiment, operations may be performed on the active object. For example, the method may include returning an object that represents an execution status of the active object as part of a "read" operation. As another example, the method may include terminating the execution of the active object as part of a "take" operation. As another example, the method may include returning an event notification as part of a "notify" operation.

In another embodiment, the method may include applying to the active object an operation associated with the object space and/or instantiating a passive object, wherein the active object performs an operation on the passive object. In another embodiment, the method may include creating the object space on a server. In another embodiment, the method may include executing the active object as an autonomous agent. In another embodiment, method may include providing a new thread of control associated with the active object.

In an alternative embodiment, a method according to the technique includes connecting to an object space, providing an object class to the object space, and obtaining results associated with execution of an object instantiated from the object class. In an embodiment, the method may include packing primitive operations into the object class. In another embodiment, the method may include disconnecting from the object space after providing the object class and reconnecting to the object space to obtain said results.

A system according to the technique includes a processor and a computer-readable medium. The system further includes an object space engine for generating an object space and an object factory for instantiating classes as active objects in the object space with respective threads of control. In an embodiment, the system may include a client program that provides at least one of the classes to the object factory. In another embodiment, the active objects include functionality to perform operations on objects in the object space. In another embodiment, at least one of the active objects includes a subclass and functionality to provide the subclass to the object factory.

The foregoing provides an illustration of particular aspects and embodiments. Other aspects and embodiments will become apparent to those of skill in the art upon a study of the examples set forth in the specification and drawings.

BRIEF DESCRIPTION OF THE DRAWINGS

Embodiments of the invention are illustrated in the figures. However, the embodiments and figures are illustrative rather than limiting; they provide examples of the invention.

FIGS. 7A, 7B, 7C, and 7D depict flowcharts of methods for exemplary primitive operations on an object space according to an embodiment.

DETAILED DESCRIPTION

Figure 1A:
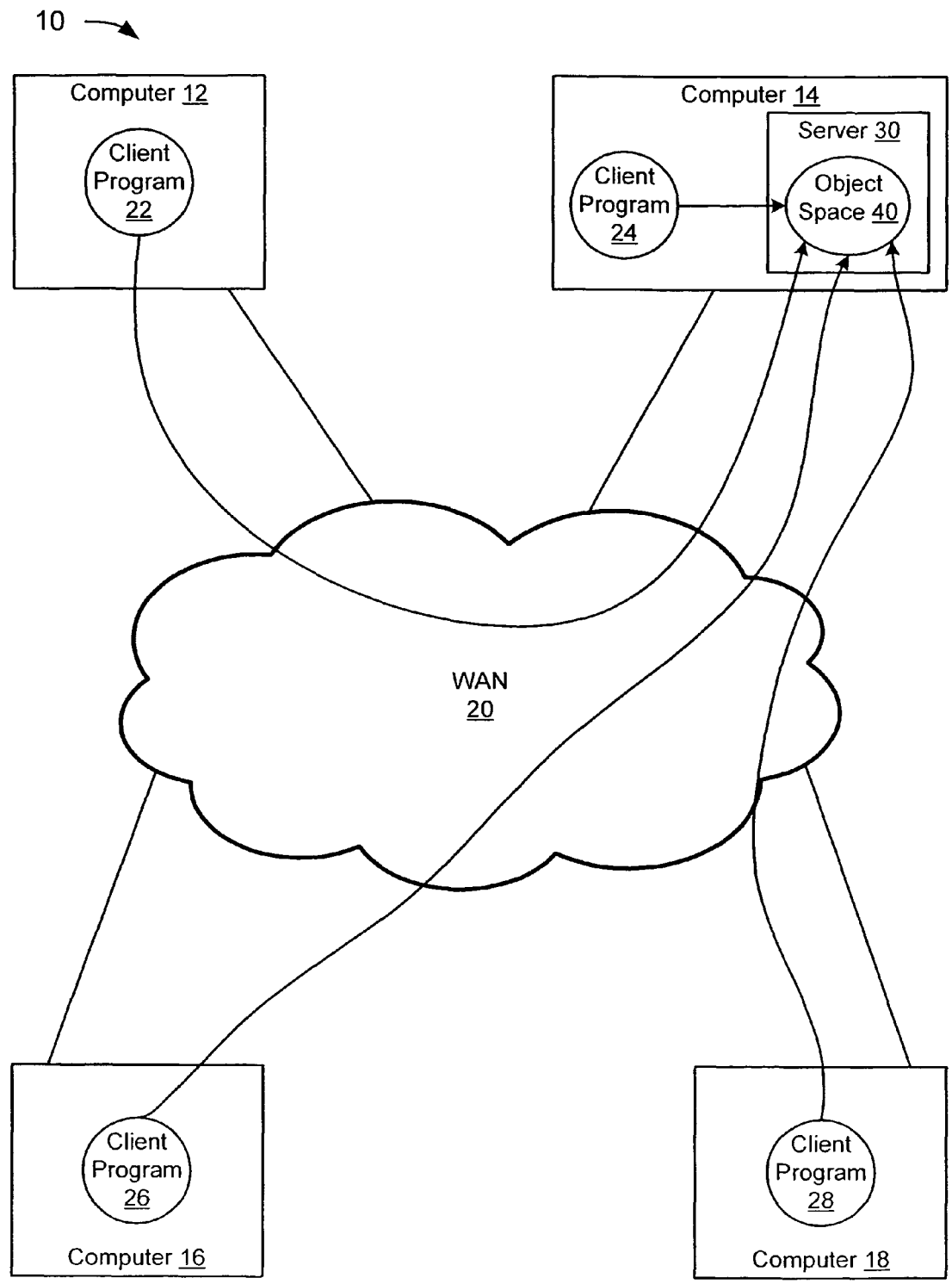
FIGS. 1A and 1B depict a prior art system that includes an object space.
Figure 1B:
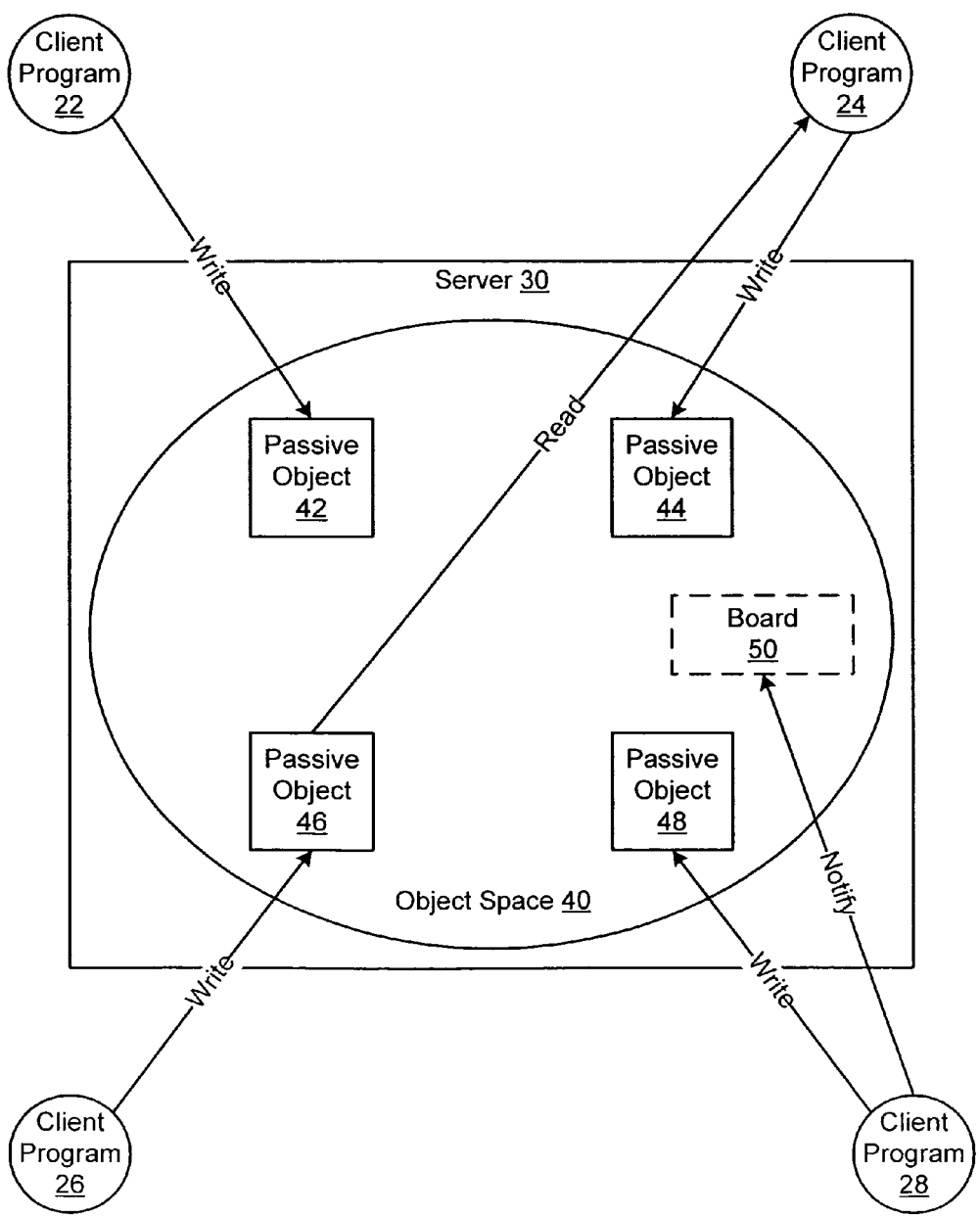
Figure 2:
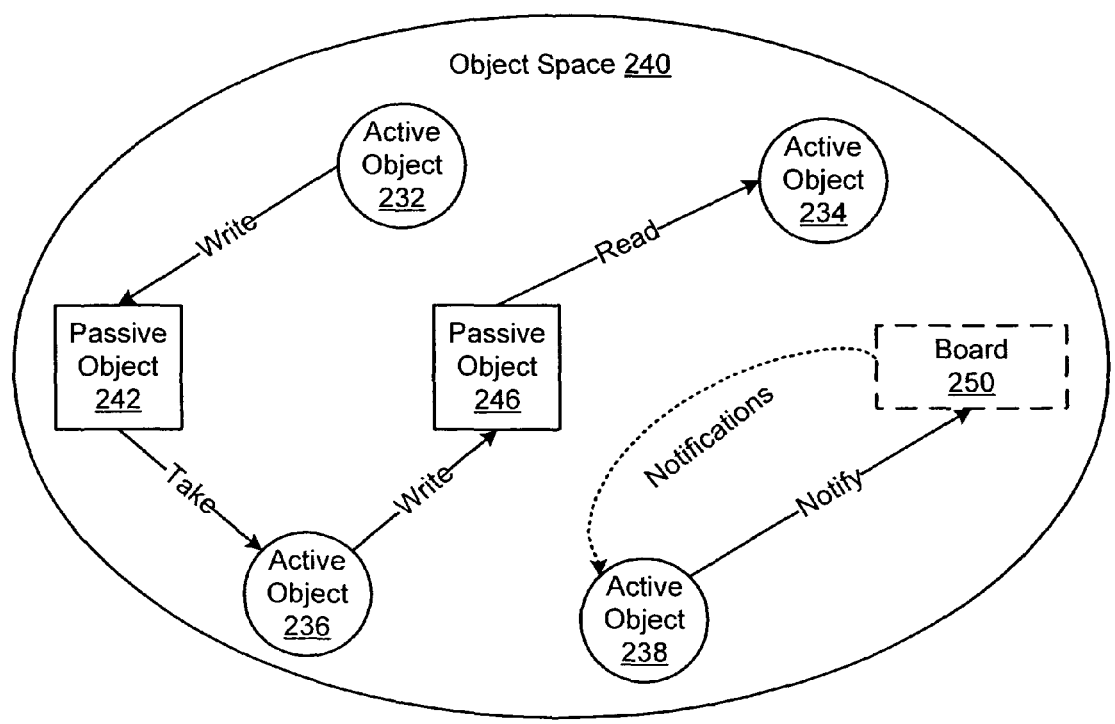
FIG. 2 depicts a conceptual view of an object space with active objects according to an embodiment.

FIG. 2 depicts a conceptual view 200 of an object space 240 with active objects 232, 234, 236, 238 according to an embodiment. The object space 240 further includes passive objects 242, 246 and a board 250.

Object spaces, as used herein, are the object-oriented incarnation of tuple spaces, where tuples (e.g., rows) in a table are replaced with objects. Active objects 232, 234, 236, 238 in the object space 240 may be capable of operations on other objects, including, in an embodiment, other active objects, within the object space 240. Some primitive operations (write, read, take, and notify) are illustrated in the example of FIG. 2. Other operations may be available in various embodiments, but a detailed description of each and every possible operation would be practically impossible and is unnecessary for an understanding of embodiments described herein.

In the example of FIG. 2, the active object 232 writes the passive object 242. The write operation puts the passive object 242 in the object space 240. As a result, the passive object 242 is available to other active objects in the object space 240. The passive object 242 is similar to objects that may be placed in an object space according to prior art techniques.

In the example of FIG. 2, the active object 236 takes the passive object 242. The take operation removes the passive object 242 from the object space 240. In an embodiment, the active object 236 has a template of an object that is used to match the passive object 242. If another object (not shown) also matches the template, in an embodiment, one object is chosen non-deterministically from the set of matches and taken by the active object 236.

In the example of FIG. 2, the active object 236 writes the passive object 246. The active object 236 may use some of the data from the passive object 242 that it took in the previous operation in this example. The passive object 246 could match the template used to take the passive object 242 (in a sense, replacing it) or it could be an entirely new passive object.

In the example of FIG. 2, the active object 234 reads the passive object 246. In an embodiment, the read operation is similar to the take operation, described previously, but the passive object 246 remains in the object space 240. Accordingly, the other active objects 232, 236, 238 could later read or take the passive object 246 (not shown).

In the example of FIG. 2, the active object 238 registers with the object space 240 for notification when a change occurs. The notify operation is sent to the board 250. If a change to an object (passive or active) that matches an associated template occurs, the board 250 is updated accordingly. Depending upon the implementation, the board 250 may provide notifications of the changes to the active object 238 or the active object 238 may retrieve data associated with the changes from the board 250 when notified thereof. Alternative implementations are also possible. The changes may include changes due to operations such as write, read, or take (or perhaps even notify).

It should be noted that operations on active objects may have different results than operations on passive objects. For example, writing an active object may include a subsequent execution step, where the execution involves providing a new thread of control to the active object. In a Java™ implementation, for example, a JAR file may be written to the object space and an active object instantiated and executed.

A read operation on an active object may return an object that represents the status of computation being carried out by the active object. For example, the status object could include a number between 0 and 100 that represents the percentage of an associated task that has been completed. The coding of the active object may include various other values that are returned in response to a read operation. For example, the status object could include an indication that the active object is running, a partial result, how much CPU time or other system resources are being consumed by the active object, or any other information. It may be desirable to provide information similar to that returned by a ps command in a UNIX system. Performing a read operation on an active object does not, in an embodiment, modify the computation in any way; it simply provides a caller with a status update.

A take operation on an active object may terminate a task being carried out by the active object. This may return a status object similar to that described above in the read example. In some cases, it is not possible to order the termination of the active object. For example, it is not usually possible to order the termination of a Java™ thread. If the active object cannot be terminated, the active object may return a status object without terminating.

A notify operation on an active object may be related to life cycle events of the set of active objects associated with the notify operation. For example, notification may occur when an active object starts execution or ends execution. The active object may define finer grain descriptions of its life cycle, including suspend and resume events. The active object may include code to provide other information, as well, depending upon the desires of the creators of the active object code, or implementation requirements or alternatives.

Figure 3:
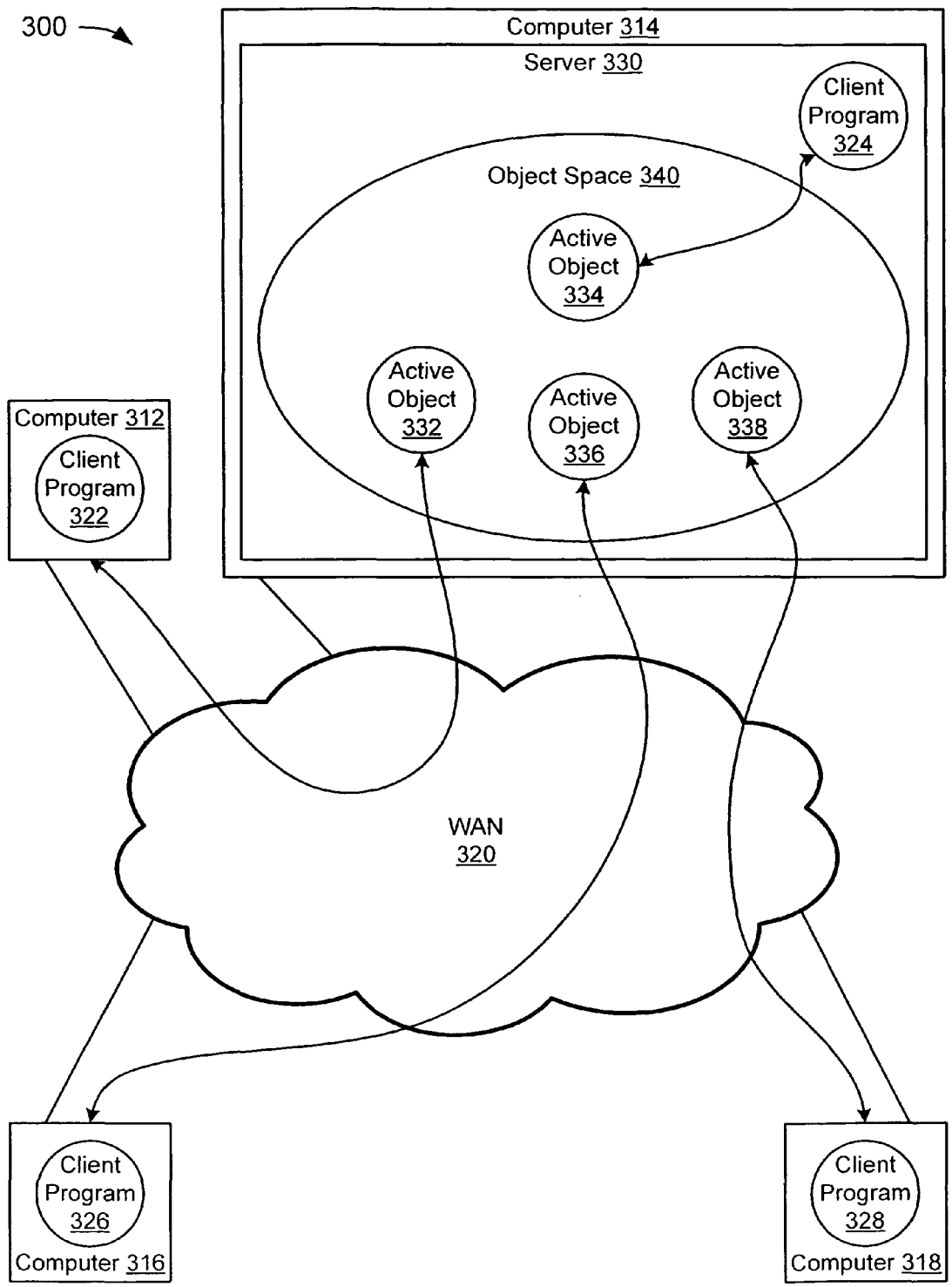
FIG. 3 depicts a conceptual view of an object space with active objects according to another embodiment.

FIG. 3 depicts a conceptual view 300 of an object space 340 with active objects 332, 334, 336, 338 according to another embodiment. FIG. 3 depicts computers 312, 314, 316, 318, with respective associated client programs 322, 324, 326, 328. The computers 312, 314, 316, 318 are coupled to one another through a WAN 320. In alternative embodiments, the WAN 320 may be any type of network, including a LAN or global information network. For illustrative purposes, the computer 314 includes a server 330 that includes the object space 340.

The object space 340 is a persistent object store with which the client programs 322, 324, 326, 328 can interact. In an embodiment, the client programs 322, 324, 326, 328 interact with the object space 340 using primitive operations such as write, which puts an object in the object space 340. In the example of FIG. 3, the client programs 322, 324, 326, 328 respectively write active objects 332, 334, 336, 338 to the object space 340.

It should be noted that a client program (e.g., the client program 322) may send a write command, along with a piece of code (which may be written in a programming language or represented in some other fashion, such as bytecode), to the server 330. The piece of code may be written into the object space 340, where an active object (e.g., the active object 332) is instantiated. Accordingly, though in this example, the client program 322 is described as writing an object to the object space 340, it should be understood that, in an embodiment, only code is written. As used herein, the "write" operation may be used to describe the entire sequence of writing code to the object space 340 and instantiating the object (and perhaps even providing an execution thread, if the object is active). Where differentiation between the writing of code and instantiating of the object is desired in this specification, a distinction is clearly made.

In the example of FIG. 3, a complex computation that, in a prior art object space, may require a large number of remote calls to the prior art object space may be accomplished with as few as one write operation. The active objects 332, 334, 336, 338 may include all of the operations necessary for the complex computation in their code. In this way, operations can be "packed" into the active objects 332, 334, 336, 338, which then execute as agents on the object space 340. After execution, the client programs may (or may not, depending on the case) retrieve the results of the complex computation. This may be accomplished by a read, a take, or some other operation.

Advantageously, since the active objects 332, 334, 336, 338 are executed locally with respect to the object space 340, performance and scalability are greatly enhanced compared to prior art object spaces. In addition to the enhanced performance and scalability, the client programs 322, 324, 326, 328 can, in an embodiment, be disconnected without impacting the execution of the active object. The client programs 322, 324, 326, 328 can then reconnect to access the result of a computation.

Figure 4:
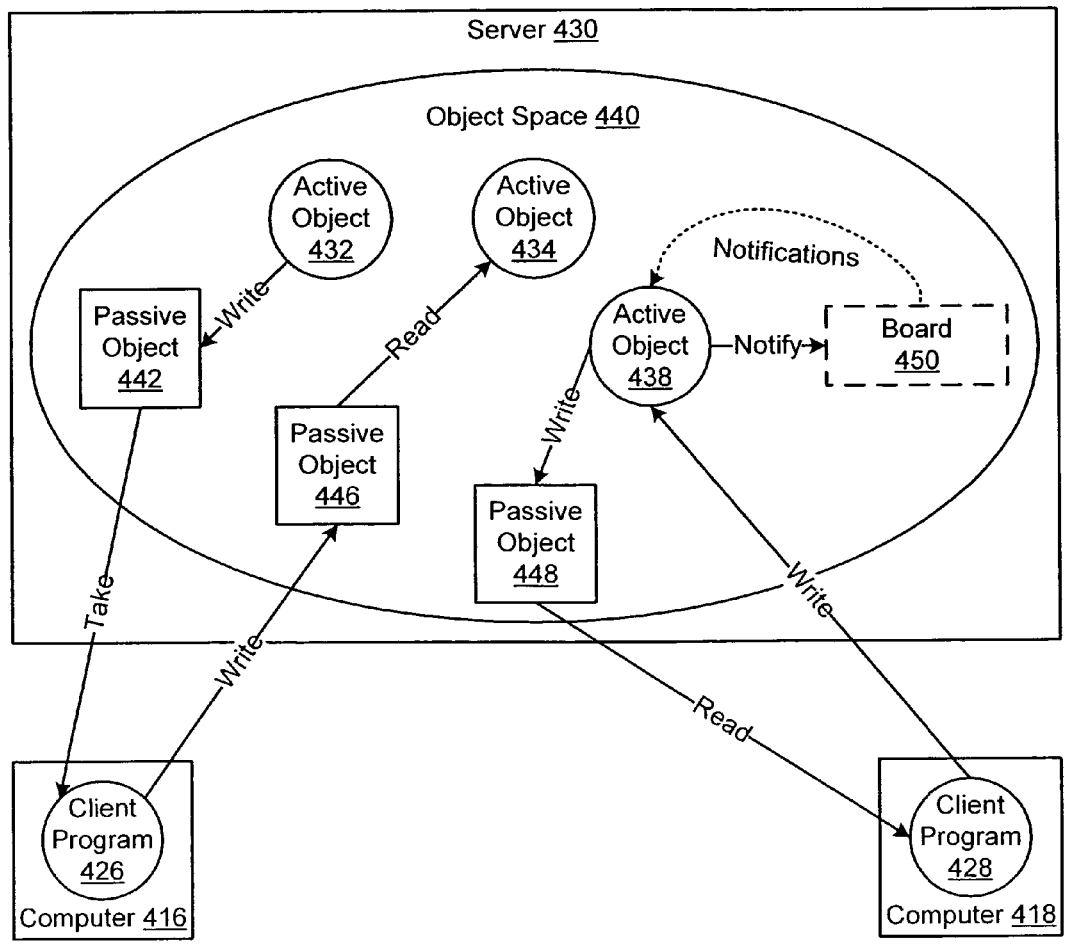
FIG. 4 depicts a conceptual view of an object space with active objects according to another embodiment.

FIG. 4 depicts a conceptual view 400 of an object space 440 with active objects 432, 434, 438 according to another embodiment. The example of FIG. 4 is intended to show that client programs 422, 426, 428 on the computers 412, 416, 418 need not be connected. A server 430 includes the object space 440. There may or may not be any local client programs running.

In the example of FIG. 4, an active object 432, which is not connected to any client program (e.g., the active object 432 has its own thread of control), writes the passive object 442. The active object 432 may or may not have been written to the object space 440 by the disconnected client program 422. The (connected) client program 426 takes the passive object 442 and writes the passive object 446 back to the object space 440. The active object 434 then reads the passive object 446. As can be seen in this example, in an embodiment, either the client programs 422, 426, 428 or active objects 432, 434, 438 can operate on the object space 440.

In the example of FIG. 4, the client program 428 writes the active object 438 to the object space 440, which issues a notify operation to the board 450. The active object 438 receives notifications, which are written to the passive object 448. The client program 428 reads the passive object 448. The client program 428 may or may not remain connected to the object space 440 during the execution of the active object 438. It should be noted that the notify mechanism may be used to inform the client program 428 that execution of the active object 438 is complete, which would obviate recording the results of notifications in some cases.

FIGS. 2-4 are intended to show examples of object spaces with active objects. These examples should be sufficient to teach one of skill in the art various other embodiments that are not shown here, but which are taught by example. Some examples of these embodiments include a technique for reducing communication latency between two parties, remote execution of tasks, handling of disconnected operations, and enriching the behavior of the object space.

To reduce communication latency between two parties according to an aspect of an embodiment, each participant's application that encapsulates, for example, a negotiation protocol, is encapsulated as an active object. If two active objects configured in this way are placed in the object space, they may exchange messages therein. This is particularly advantageous with negotiation protocols because often a large number of short messages are exchanged. As a result of this technique, a communication-intensive part of a distributed application can be located in the object space (e.g., on the same machine), which speeds up the execution of the negotiation phase. When the negotiation phase ends, each active object can communicate back the result to the application that originally sent it to the object space.

For remote execution of tasks according to an aspect of an embodiment, a resource-intensive task (e.g., in terms of CPU, memory, or some other resource) can be performed on a machine that has available resources. For example, a client program may encapsulate a task inside an active object and send the active object to a remote object space. The task can be executed there and the user can retrieve the result when the result is ready, using, for example, a notification mechanism as described above. Examples of tasks that may be advantageously remotely executed are complex optimization algorithms or the rendering of complex scenes in computer graphics applications.

Handling disconnected operations according to an aspect of an embodiment may be desirable when client programs are transiently connected to the object space. This may be advantageous, for example, to save on communication costs or for use on mobile devices that do not have permanent connectivity to, e.g., the Internet. In contrast, with a prior art object space, a client program might miss coordination events that happen on the object space and get "out of synch" with the rest of a distributed system.

In an embodiment, a client program can decide, before shutting its network connection, to send an active object to the object space. The active object can act as a surrogate for the client program while the client program is disconnected. The active object could, for example, listen to the same events that the client program would have listened to were it still connected. When the client program reconnects, it retrieves from the active object a summary of what happened while disconnected, then terminates the active object. This allows the client program to resume coordination with other participants just as if it had never been disconnected. Alternatively, an active object may be allowed to run on the space the entire time, whether connected or not, and the client program obtains synchronization data from the active object from time to time.

Enriching the behavior of an object space according to an aspect of an embodiment may include providing behavior associated with a client program to the object space. For example, a client program may provide an active object that acts as an HTTP server and provides a Web interface to the object space. As another example, an active object could register to receive events about what is happening on the object space and provide a view of the object space for an external monitoring application. As another example, an active object could act as a replication device, copying from the object space any new object that appears on the object space (using, e.g., the read primitive operation) and sending the new object to another object space (using, e.g., the write primitive operation).

The various aspects of embodiments would be too numerous to describe in detail. However, one of skill in the art should find that other aspects of the various embodiments are determinable from the teaching provided herein.

Figure 5A:
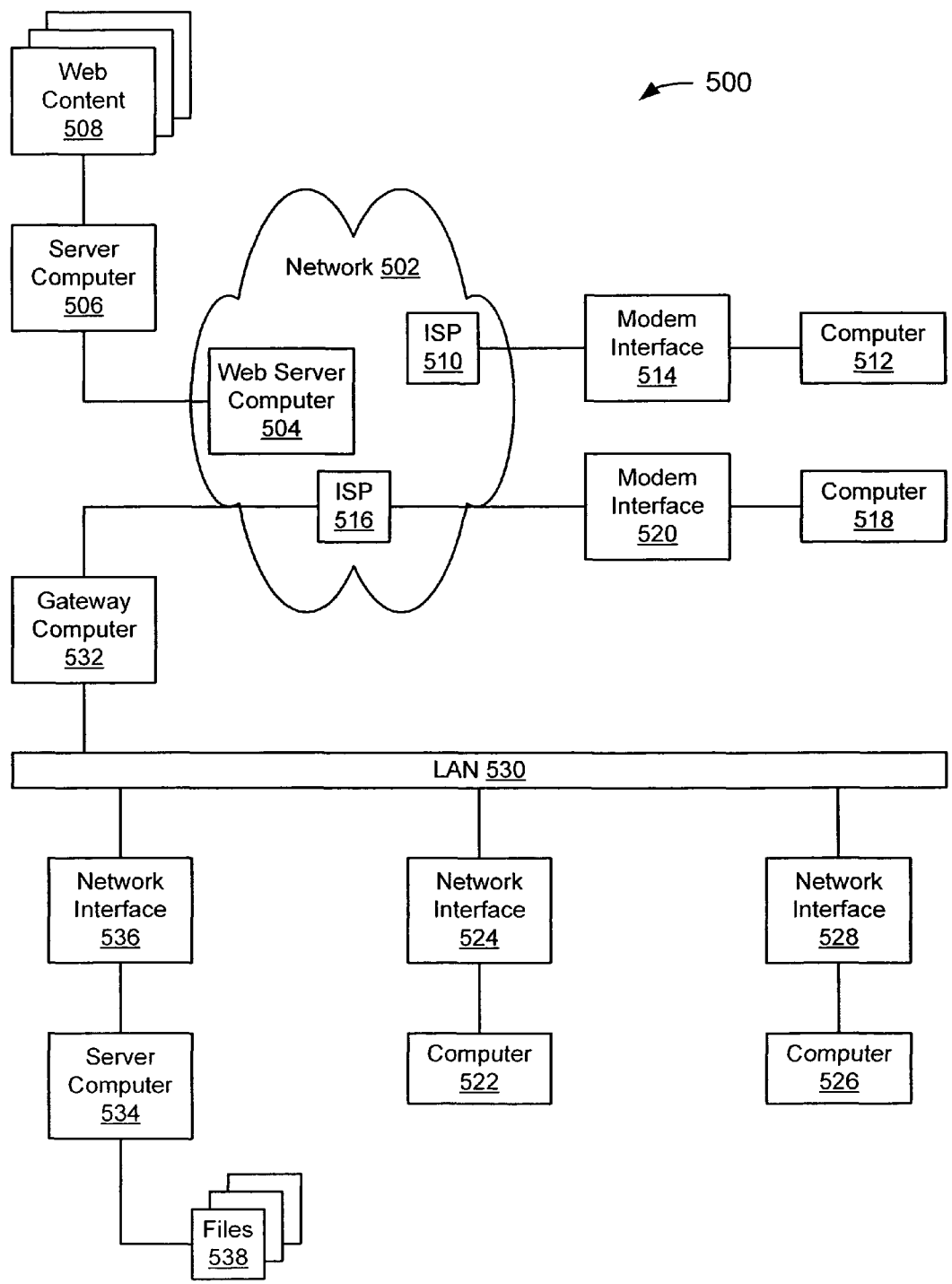
FIGS. 5A, 5B, and 5C depict a conceptual view of a system on which an object space with active objects may be implemented according to an embodiment.
Figure 5B:
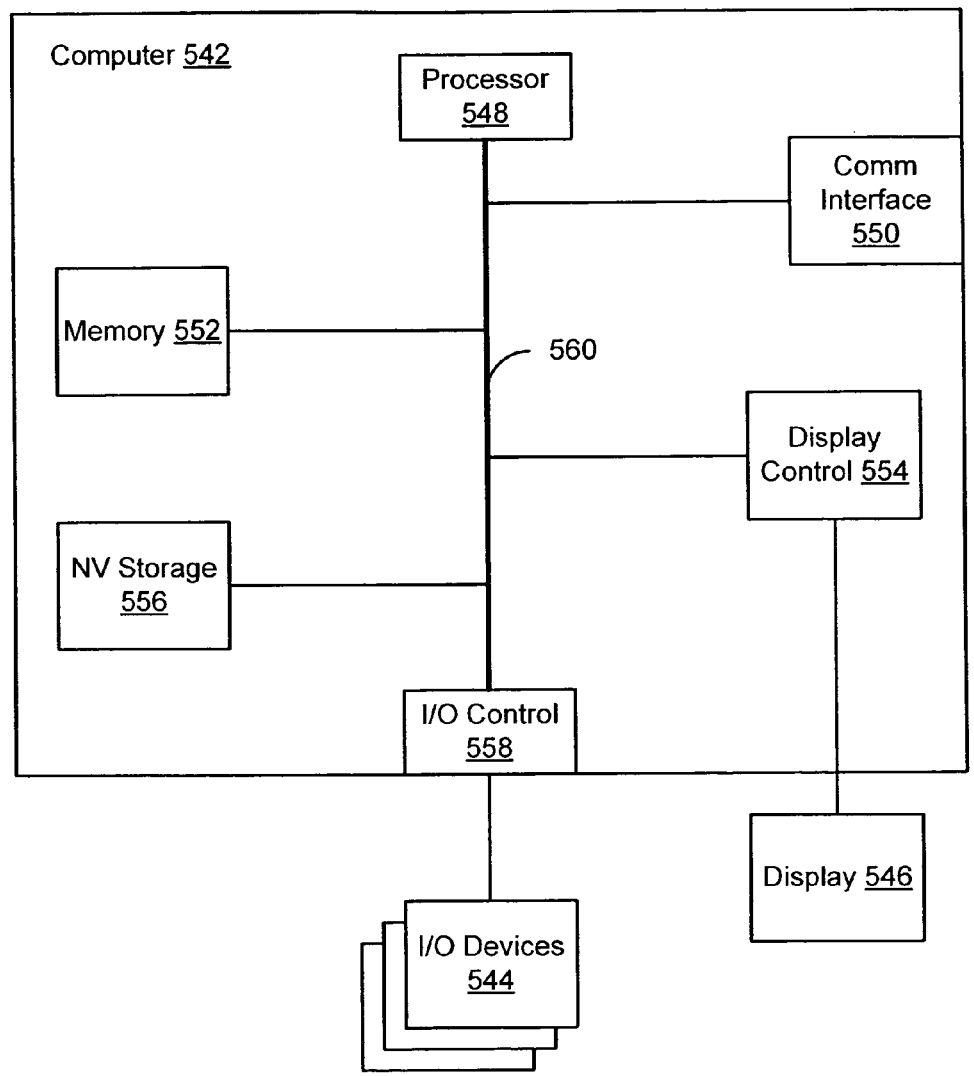
Figure 5C:
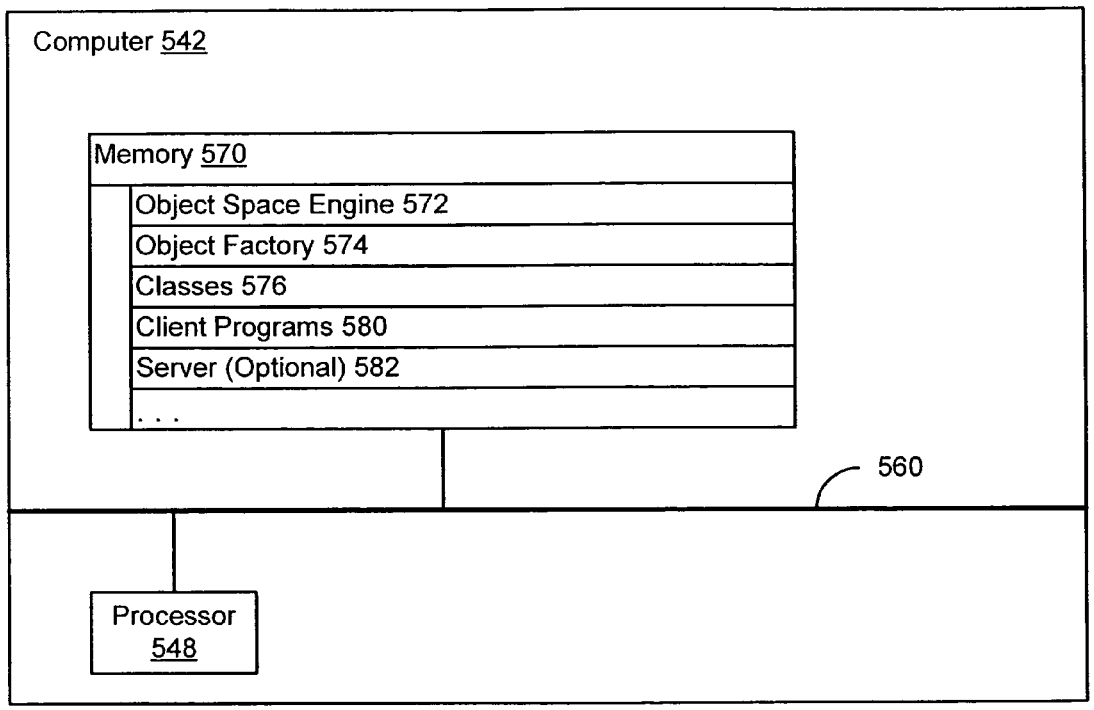

FIGS. 5A, 5B, and 5C depict a conceptual view of a system on which an object space with active objects may be implemented according to an embodiment. The following description of FIGS. 5A to 5C is intended to provide an overview of computer hardware and other operating components suitable for performing the methods of embodiments described herein, but is not intended to limit the applicable environments. Similarly, the computer hardware and other operating components may be suitable as part of the apparatuses of embodiments described herein. Other embodiments can be practiced with other computer system configurations, including hand-held devices, multiprocessor systems, microprocessor-based or programmable consumer electronics, network PCs, minicomputers, mainframe computers, and the like. Other embodiments can also be practiced in distributed computing environments where tasks are performed by remote processing devices that are linked through a communications network.

FIG. 5A depicts a networked system 500 that includes several computer systems coupled together through a network 502, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

The web server computer 504 is typically at least one computer system which operates as a server computer system and is configured to operate with the protocols of the World Wide Web and is coupled to the Internet. The web server computer 504 can be a conventional server computer system. Optionally, the web server computer 504 can be part of an ISP which provides access to the Internet for client systems. The web server computer 504 is shown coupled to the server computer 506 which itself is coupled to web content 508, which can be considered a form of a media database. While two computers 504 and 506 are shown in FIG. 5A, the web server computer 504 and the server computer 506 can be one computer system having different software components providing the web server functionality and the server functionality provided by the server computer 506, which will be described further below.

Access to the network 502 is typically provided by Internet service providers (ISPs), such as the ISPs 510 and 516. Users on client systems, such as client computer systems 512, 518, 522, and 526 obtain access to the Internet through the ISPs 510 and 516. Access to the Internet allows users of the client computer systems to exchange information, receive and send e-mails, and view documents, such as documents which have been prepared in the HTML format. These documents are often provided by web servers, such as web server 504, which are referred to as being "on" the Internet. Often these web servers are provided by the ISPs, such as ISP 510, although a computer system can be set up and connected to the Internet without that system also being an ISP.

Client computer systems 512, 518, 522, and 526 can each, with the appropriate web browsing software, view HTML pages provided by the web server 504. The ISP 510 provides Internet connectivity to the client computer system 512 through the modem interface 514, which can be considered part of the client computer system 512. The client computer system can be a personal computer system, a network computer, a web TV system, or other computer system. While FIG. 5A shows the modem interface 514 generically as a "modem," the interface can be an analog modem, ISDN modem, cable modem, satellite transmission interface (e.g. "direct PC"), or other interface for coupling a computer system to other computer systems.

Similar to the ISP 514, the ISP 516 provides Internet connectivity for client systems 518, 522, and 526, although as shown in FIG. 5A, the connections are not the same for these three computer systems. Client computer system 518 is coupled through a modem interface 520 while client computer systems 522 and 526 are part of a LAN 530.

Client computer systems 522 and 526 are coupled to the LAN 530 through network interfaces 524 and 528, which can be Ethernet network or other network interfaces. The LAN 530 is also coupled to a gateway computer system 532 which can provide firewall and other Internet-related services for the local area network. This gateway computer system 532 is coupled to the ISP 516 to provide Internet connectivity to the client computer systems 522 and 526. The gateway computer system 532 can be a conventional server computer system.

Alternatively, a server computer system 534 can be directly coupled to the LAN 530 through a network interface 536 to provide files 538 and other services to the clients 522 and 526, without the need to connect to the Internet through the gateway system 532.

FIG. 5B depicts a computer system 540 for use in the system 500 (FIG. 5A). The computer system 540 may be a conventional computer system that can be used as a client computer system or a server computer system or as a web server computer system. Such a computer system can be used to perform many of the functions of an Internet service provider, such as ISP 510 (FIG. 5A). The computer system 540 includes a computer 542, I/O devices 544, and a display device 546. The computer 542 includes a processor 548, a communications interface 550, memory 552, display controller 554, non-volatile storage 556, and I/O controller 558. The computer system 540 may be couple to or include the I/O devices 544 and display device 546.

The computer 542 interfaces to external systems through the communications interface 550, which may include a modem or network interface. It will be appreciated that the communications interface 550 can be considered to be part of the computer system 540 or a part of the computer 542. The communications interface can be an analog modem, isdn modem, cable modem, token ring interface, satellite transmission interface (e.g. "direct PC"), or other interfaces for coupling a computer system to other computer systems.

The processor 548 may be, for example, a conventional microprocessor such as an Intel Pentium microprocessor or Motorola power PC microprocessor. The memory 552 is coupled to the processor 548 by a bus 560. The memory 552 can be dynamic random access memory (DRAM) and can also include static ram (SRAM). The bus 560 couples the processor 548 to the memory 552, also to the non-volatile storage 556, to the display controller 554, and to the I/O controller 558.

The I/O devices 544 can include a keyboard, disk drives, printers, a scanner, and other input and output devices, including a mouse or other pointing device. The display controller 554 may control in the conventional manner a display on the display device 546, which can be, for example, a cathode ray tube (CRT) or liquid crystal display (LCD). The display controller 554 and the I/O controller 558 can be implemented with conventional well known technology.

The non-volatile storage 556 is often a magnetic hard disk, an optical disk, or another form of storage for large amounts of data. Some of this data is often written, by a direct memory access process, into memory 552 during execution of software in the computer 542. One of skill in the art will immediately recognize that the terms "machine-readable medium" or "computer-readable medium" includes any type of storage device that is accessible by the processor 548 and also encompasses a carrier wave that encodes a data signal.

The computer system 540 is one example of many possible computer systems which have different architectures. For example, personal computers based on an Intel microprocessor often have multiple buses, one of which can be an I/O bus for the peripherals and one that directly connects the processor 548 and the memory 552 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 552 for execution by the processor 548. A Web TV system, which is known in the art, is also considered to be a computer system according to the present invention, but it may lack some of the features shown in FIG. 5B, such as certain input or output devices. A typical computer system will usually include at least a processor, memory, and a bus coupling the memory to the processor.

In addition, the computer system 540 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 556 and causes the processor 548 to execute the various acts required by the operating system to input and output data and to store data in memory, including storing files on the non-volatile storage 556.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-roms, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the present invention is not described with reference to any particular programming language, and various embodiments may thus be implemented using a variety of programming languages.

FIG. 5C depicts an alternative conceptual view of the computer system 540 (FIG. 5B). FIG. 5C depicts the computer system 542, including a processor 548, a bus 560, and memory 570. The bus 560 couples the processor 548 to the memory 570.

The computer system 540 may be connected to a global information network, such as the Internet, a local or wide area network (LAN or WAN), or some other intranet or network. For example, the computer system 540 may be connected to the network 502 (FIG. 5A). In an embodiment, the computer system 540 is not connected to a network. In another embodiment, the computer system 540 is connected transiently to a network, such as in a mobile computing embodiment.

The memory 570 may include both volatile memory, such as DRAM or SRAM, and non-volatile memory, such as magnetic or optical storage, or any other combination of hardware, firmware, or software used to employ data or programs. The processor 548 executes programs in the memory 570. The memory 570 includes an object space engine 572, an object factory 574, classes 576, one or more client programs 580, and an optional server 582.

The object space engine 572 is configured to generate a persistent object store (an object space) that client programs 582 can interact with using a set of operations including, but not limited to, read and write. The object factory 574 instantiates objects in the objects space. To instantiate an object, the object factory 574 may translate classes 576, which may be implemented as segments of code (e.g., JAR files in a JAVA™ implementation) into an object in the object space, according to techniques that are well-known in the art of object-oriented computer programming. The processor may start execution of an object using a new thread of control.

In general, objects instantiated from the classes 576 may include active objects and passive objects. In an embodiment, a difference between the active objects and the passive objects is that the active objects are executed on the object space, while the passive objects are placed on the object space, but are not executed thereon. It should be noted that the active objects may include dormant active objects (e.g., active objects that are on the object space, but that are not currently being executed). As used herein, dormant active objects are distinguished from active objects when useful for descriptive purposes. In some cases, dormant active objects may be treated as passive objects.

The client programs 580 may perform operations on the object space similar to the active objects. It should be noted that the client programs 580 need not be locally stored. For example, external client programs may access the object space through a network from a location external to the computer system 540. The optional server 582 may be used to serve object space-related content (and other content, if desired) to externally located client programs.

In an embodiment, an external client program may write an active object onto the object space and allow the active object to perform a set of operations on the object space. While the active object performs the set of operations, the external client program need not stay connected (e.g., because the active object has its own thread of control). Later, the external client program can retrieve the results of the set of operations performed by the active object. In this way, the active object behaves as an autonomous agent for the external client program.

Advantageously, since some (or all) operations of a task can be executed locally on the object space using an autonomous agent of the client programs, performance is enhanced. Moreover, since the client programs need not stay connected, scalability can be enhanced, as well. These advantages may be realized even for the (local) client programs 580.

Figure 6A:
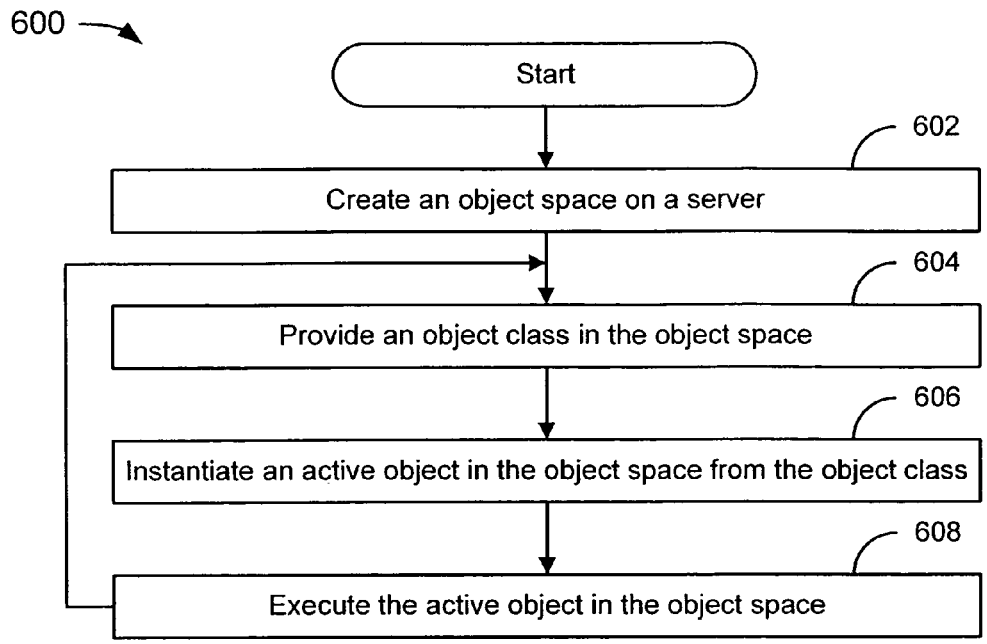
FIGS. 6A and 6B depict flowcharts of methods according to embodiments.
Figure 6B:
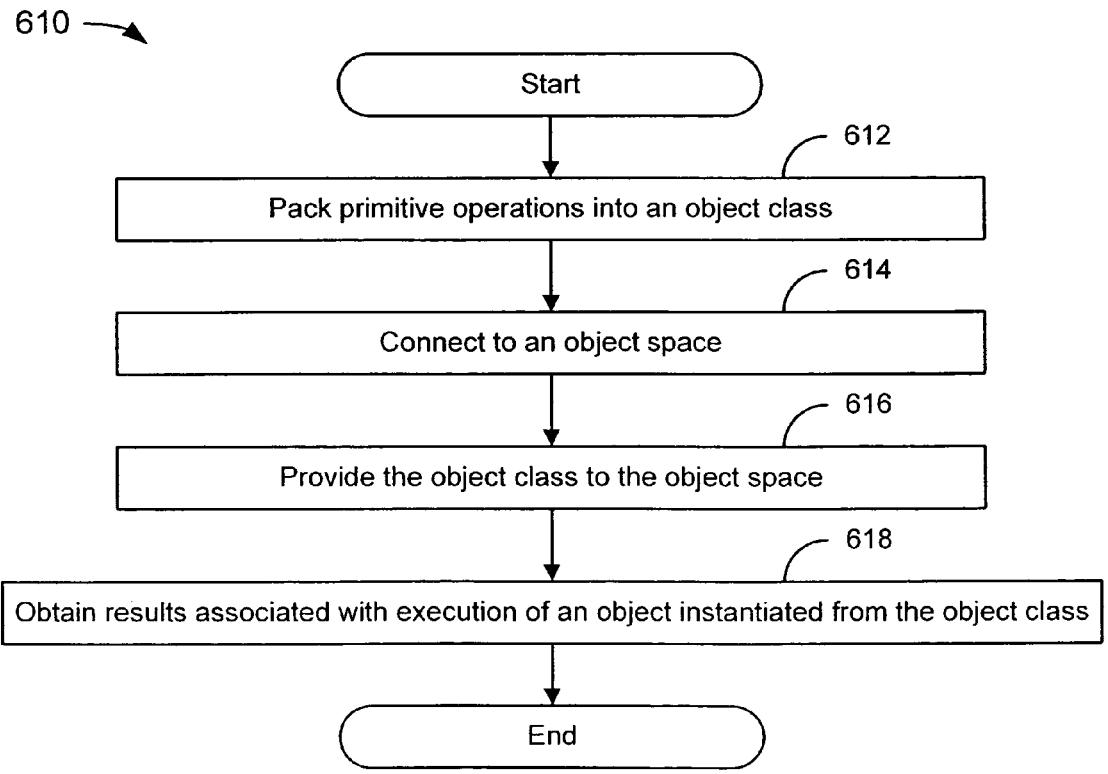

Various methods may be used to implement active objects in an object space. For example, FIGS. 6A and 6B depict flowcharts of methods according to embodiments. In the example of FIG. 6A, a flowchart 600 shows a method that may be implemented at a server. In the example of FIG. 6B, a flowchart 610 shows a method that may be implemented at a client program, whether local or remote.

In the example of FIG. 6A, the flowchart 600 starts at module 602 when an object space is created on a server. After the object space is created, in an embodiment, the flowchart 600 continues at module 604 when an object class is provided in the object space. The object class may be a code segment. In an embodiment, the flowchart 600 continues at module 606 when an active object is instantiated in the object space from the object class. It should be noted that passive objects can also be created in this manner, but passive objects are not executed later (unless the passive objects are actually dormant active objects). In an embodiment, the flowchart 600 continues at module 608 when the active object is executed in the object space. The active object may receive its own (e.g., a dedicated) thread of control. The flowchart 600 may then repeat modules 604 to 608 for additional active objects written to the object space.

This method and other methods are depicted as serially arranged modules. However, modules of the methods may be reordered, or arranged for parallel execution as appropriate.

In the example of FIG. 6B, the flowchart 610 starts at module 612 when primitive operations are packed into an object class. A programmer may create the object class, along with the primitive operations packed into the object class, well in advance of the subsequent modules of the flowchart 610. Alternatively, the object class could be packed "on the fly" using a software agent.

In an embodiment, the flowchart 610 continues at module 614 when connection to the object space is made. In an embodiment, the flowchart 610 continues at module 616 when the object class is provided to the object space. The connection may or may not be broken following providing the object class to the object space. If the connection is broken, a connection should be reestablished before the flowchart 610 proceeds (unless results are obtained through some other manner or results are not needed). In an embodiment, the flowchart 610 continues at module 618 when results associated with execution of an object instantiated from the object class are obtained. The flowchart 610 ends after obtaining the results. Alternatively, a client program may continue from the module 612 (packing primitives into another object class), from the module 614 (reconnecting to the object space if disconnected), from the module 616 (providing a new object class to the object space), or from the module 618 (repeatedly obtaining additional results).

FIGS. 7A, 7B, 7C, and 7D depict flowcharts of methods for exemplary primitive operations on an object space according to an embodiment. Other primitive operations are possible, as are other (non-primitive) operations. FIGS. 7A, 7B, 7C, and 7D are intended to show a typical set of primitive operations. Other possible primitive operations are too numerous to describe in detail and the total number of potential operations is practically impossible to enumerate. It is expected that one of skill in the art could extrapolate using the primitive operations described herein as examples.

In the example of FIG. 7A for an exemplary write primitive operation, a flowchart 700A starts at decision point 702 where it is determined whether an object is active. It should be noted that an actual determination by a client program may not be necessary. For example, a client program may apply a single write primitive to both passive and active objects, with differing results.

If it is determined that the object is active (702-Y), then the flowchart 700A continues at module 704 when an active object is inserted into the object space. In an embodiment, the flowchart continues at decision point 706 when it is determined whether to delete an original. An original may be an active object, client program, or some other data structure. It should be noted that deleting the original is an optional step. In alternative embodiments, the original may be deleted with a take operation or not deleted at all. If it is determined that the original is to be deleted (708-Y) then the flowchart 700A continues at module 708 when the original is deleted and the write operation ends. If not (708-N), then the write operation ends without deleting the original.

If, on the other hand, it is determined that the object is not active (702-N), then the flowchart 700A continues at module 710 when the passive object is posted to the board (or to the object space), and the write operation ends. The passive object may be a dormant active object.

In the example of FIG. 7B for an exemplary take operation, a flowchart 700B starts at decision point 712 where it is determined whether an object is active. If the object is active (712-Y), then the flowchart 700B continues at module 714 when the active object is converted to a passive object. The conversion may or may not entail cutting the active object's thread of control. In an embodiment, the flowchart 700B continues at module 716 when the (now) passive object is removed and the take operation ends. If, on the other hand, it is determined that the object is not active (712-N), then the flowchart 700B continues at module 718 when the passive object is deleted from the board (or object space) and the take operation ends.

In the example of FIG. 7C for an exemplary read operation, a flowchart 700C starts at decision point 722 where it is determined whether an object is active. If the object is active (722-Y), then the flowchart 700C continues at module 724 when an execution status of the active object is received and the read operation ends. If, on the other hand, it is determined that the object is not active (722-N), then the flowchart 700C continues at module 726 when data associated with the passive object is received and the read operation ends.

In the example of FIG. 7D for an exemplary notify operation, a flowchart 700D starts at decision point 732 where it is determined whether an event has occurred. An event may be a life cycle event or some other event that changes an object that is identified by a template associated with the notify operation. If it is determined that an event has occurred (732-Y), then the flowchart 700D continues at module 734 with receiving event notification and the flowchart 700D repeats the decision point 732. If, on the other hand, it is determined that an event has not occurred (732-N), then the notify operation ends.

Figure 8:
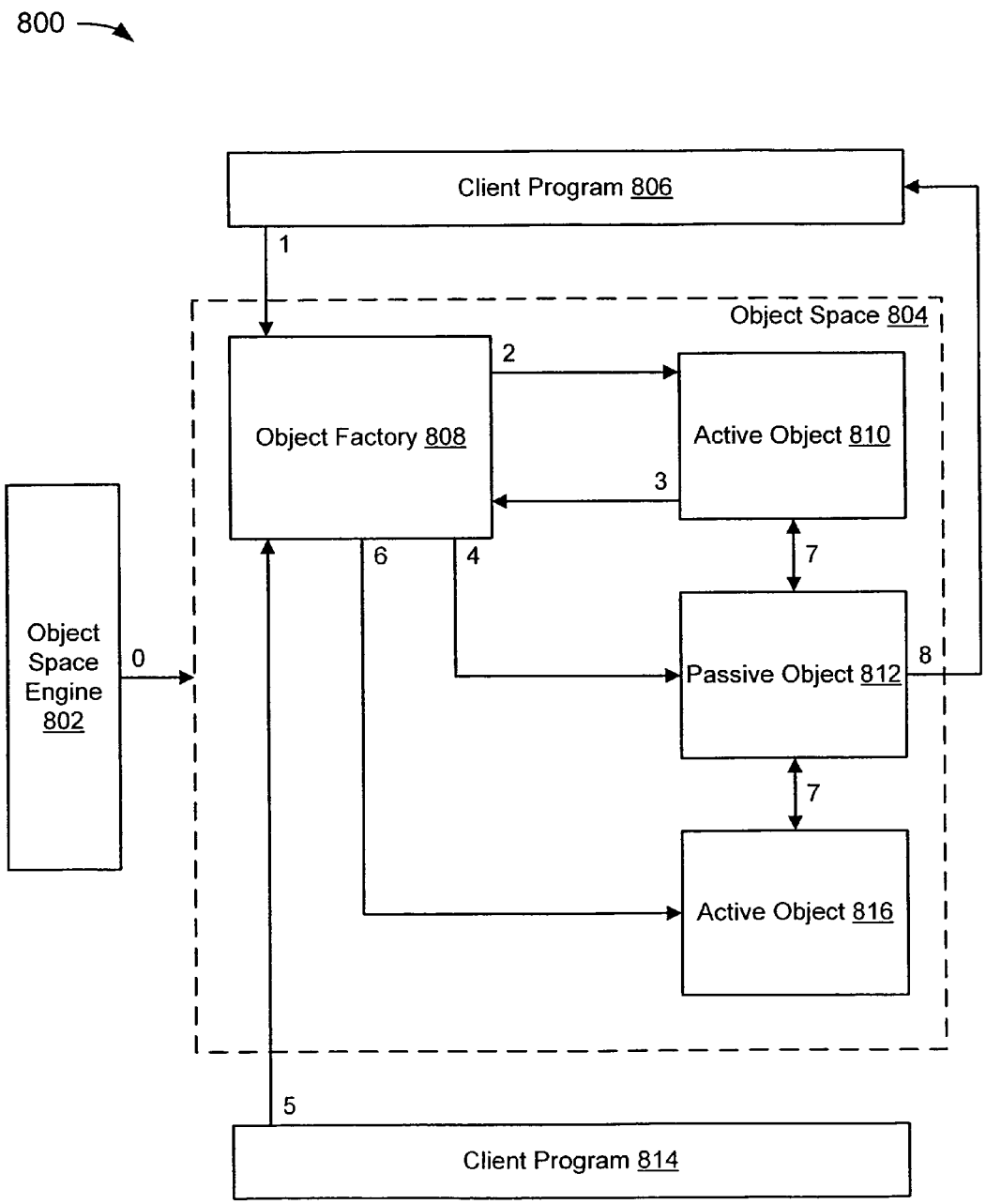
FIG. 8 depicts a conceptual diagram of an exemplary process according to an embodiment.

FIG. 8 depicts a conceptual diagram 800 of an exemplary process according to an embodiment. The diagram 800 includes an object space engine 802, an object space 804, a client program 806, an object factory 808, an active object 810, a passive object 812, a client program 814, and an active object 816. The process advances according to the illustrative arrows, which are numbered 0 to 8.

In the example of FIG. 8, the object space engine 802 creates the object space 804. The client program 806 then sends a piece of code to the object factory 808. The object factory 808 instantiates the active object 810 in the object space 804. The active object 810 sends a piece of code to the object factory 808, which instantiates a passive object 812 from the code. It should be noted that the object factory 808 may simply be a part of the object space 804. For example, writing a piece of code to the object space 804 may result in an object being instantiated from the code.

In the example of FIG. 8, the client program 816 then provides a piece of code to the object factory 808, which instantiates the active object 818. The active objects 810 and 818 perform operations on the passive object, such as read or write. It should be noted that writing the passive object 812 actually may entail taking the passive object 812 and replacing it with another passive object having a similar (or identical) template. In this way, the active object 810 could write the passive object 812, and the active object 818 could take the passive object 812, alter the data according to a computation, and write another passive object with a similar template, which the active object 810 can then read or take, if desired. Eventually, in this example, the client program 806 reads the passive object 812, thereby obtaining the results of a distributed task.

The example of FIG. 8 is only one of a practically innumerable variations of aspects of embodiments. The example is intended to illustrate unidirected interaction.

As used herein, unidirected interaction means that the systems involved in exchanging messages or in a distributed task do not necessarily need to know the sender of a message or the recipient of a message. This may entail routing messages within an object space according to primitive operations issued by participants to or active objects within the object space.

A task may be referred to as "distributed" when the systems collaborate to complete the task. As used herein, decoupling refers to the removing of constraints in space or time when two or more systems collaborate in order to perform a task. As used herein, decoupling in space means that the systems involved are not bound to a physical location, and can move around without disturbing execution of a distributed task. As used herein, decoupling in time means that the systems involved do not need to be available at the same time in order for a distributed task to complete execution properly.

When a complex task is planned, it may be desirable to alter the planned execution at runtime in order to adapt to the data being processed or the availability of service providers. Coordination between collaborating systems when executing a distributed task is a practical necessity in complex computing. As used herein, space-based systems provide a place where systems can publish information, retrieve information, and achieve synchronization at runtime.

In this way, systems can send a behavior to the object space and have the active object associated with that behavior execute as an agent, even if the system becomes disconnected from the object space. For this reasons, some active objects could be referred to as autonomous agents for client programs that are external to the object space. As used herein, behavior mobility means code can be passed to the object space in order to enrich the object space with a behavior that it didn't previously have. The code (in the form of classes for object-oriented languages such as Java™) gets instantiated as objects (e.g., active objects) on the object space.

As used herein, classes refer to snippets, sequences, pieces or segments of code that may be instantiated as objects. Several popular object-oriented programming languages, such as Java and C++, use classes. However, it should be noted that the embodiments described herein should not be limited to only those programming languages that use classes; the embodiments include all object-oriented implementations, whether classes are used or not. Accordingly, as used herein, the term "classes" should be understood to mean data that can be used to instantiate an object.

As used herein, an active object is an object that can be executed on the object space. For example, the object space may provide an execution environment for active objects. To be autonomous with respect to client programs, an active object may be provided with its own thread of execution. Active objects may be able to perform operations on the object space that are similar to operations by client programs that are external to the object space.

As used herein, dormant active objects are active objects that are not being executed. Dormant active objects may not have a thread of control. Typically, dormant active objects are treated the same as passive objects, except that dormant active objects can, of course, become active objects.

While this invention has been described in terms of certain embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention.

What is claimed is:

1. A computer-implemented method, comprising:
creating an object space on a first computing device;
providing an object class, by a client program executing on a second computing device, in the object space on the first computing device;
instantiating an active object, by the client program, in the object space from the object class, wherein the second computing device is remote from the first computing device;
providing a new thread of control associated with the active object;
disconnecting, the client program, from the object space on the first computing device;
executing the active object locally in the object space on the first computing device independent of any remote connection to the object space by a remote entity, including the client program; and
enabling a disconnected entity, including the client program, to reconnect to the object space on the first computing device and access the active object; and
reconnecting, by the client program, to the object space on the first computing device to access the active object, wherein the active object and the client program perform operations on objects in the object space.

2. The computer-implemented method of claim 1, further comprising returning an object that represents an execution status of the active object.

3. The computer-implemented method of claim 2, wherein said execution status includes information selected from the group consisting of an indication that the active object is executing, an estimate of the proportion of execution that is complete, an estimate of the proportion of execution that remains, a partial result of execution, an indication of system resources consumed, an execution state, and an execution status update.

4. The computer-implemented method of claim 1, further comprising terminating the execution of the active object.

5. The computer-implemented method of claim 1, further comprising returning an event notification.

6. The computer-implemented method of claim 5, wherein said event notification includes information selected from the group consisting of a start of execution indicator, an end of execution indicator, a suspended execution indicator, a resume execution indicator, a life cycle event indicator, and a life cycle update.

7. The computer-implemented method of claim 1, further comprising applying to the active object an operation associated with the object space.

8. The computer-implemented method of claim 1, further comprising instantiating a passive object, wherein the active object performs an operation on the passive object.

9. The computer-implemented method of claim 1, wherein creating the object space on the first computing device comprises creating the object space on a server.

10. The computer-implemented method of claim 1, wherein said executing the active object includes executing the active object as an autonomous agent.

11. A computer-implemented method, comprising:
connecting, by a client program executing on a first computing device, to an object space created on a second computing device, wherein the second computing device is remote from the first computing device;
providing an object class, by the client program, to the object space on the second computing device;
disconnecting, the client program, from the object space on the second computing device;
obtaining results associated with execution of an active object, the active object instantiated, by the client program from the object class, with a new thread of control locally in the object space on the second computing device and executing independent of any remote connection to the object space by a remote entity, including the client program, wherein a disconnected entity, including the client program, is able to reconnect to the object space on the second computing device and access the instantiated active object; and
reconnecting, by the client program, to the object space on the second computing device to obtain said results, wherein the active object and the client program perform operations on objects in the object space.

12. The computer-implemented method of claim 11, further comprising packing primitive operations into the object class.

13. A system comprising:
a processor;
a non-transitory tangible computer-readable medium for storing data and executable code;
an object space engine, executable by the processor on a first computing device, that is configured to generate an object space on the first computing device; and
an object factory, executable by the processor on the first computing device, that is configured to:
instantiate classes as active objects, by client programs stored on the non-transitory tangible computer-readable medium and executing on other computing devices, in the object space on the first computing device with respective threads of control locally in the object space, the active objects executing independent of any connection to the object space by a remote entity, including the other computing devices, wherein the client programs are configured to provide classes to the object factory and the other computing devices are remote from the first computing device;
disconnect, the client programs, from the object space on the first computing device;
enable a disconnected entity, including the client programs, to reconnect to the object space on the first computing device and access the active objects; and
reconnect, by the client programs, to the object space on the first computing device to access the active objects, wherein the active objects and the client programs are configured to perform operations on objects in the object space.

14. The system of claim 13, wherein the client programs are configured to perform operations on any object in the object space if adequate information about the object is known.

15. The system of claim 13, wherein at least one of the active objects includes a subclass and functionality to provide the subclass to the object factory.

* * * * *